US010476809B1

(12) United States Patent
Daniel et al.

(10) Patent No.: US 10,476,809 B1
(45) Date of Patent: Nov. 12, 2019

(54) MOVING VIRTUAL MACHINES USING MIGRATION PROFILES

(71) Applicant: Amazon Technologies, Inc., Reno, NV (US)

(72) Inventors: Mathew Daniel, Johannesburg (ZA); Andries Petrus Johannes Dippenaar, Cape Town (ZA); Gavin Alexander Bramhill, Cape Town (ZA)

(73) Assignee: Amazon Technologies, Inc., Seattle, WA (US)

( * ) Notice: Subject to any disclaimer, the term of this patent is extended or adjusted under 35 U.S.C. 154(b) by 127 days.

(21) Appl. No.: 14/207,036

(22) Filed: Mar. 12, 2014

(51) Int. Cl.
*G06F 15/173* (2006.01)
*H04L 12/911* (2013.01)
*G06F 9/455* (2018.01)

(52) U.S. Cl.
CPC ............. *H04L 47/70* (2013.01); *G06F 9/455* (2013.01)

(58) Field of Classification Search
CPC . G06F 2009/45587; G06F 2009/45595; G06F 2009/4557; G06F 9/5088; G06F 9/45558; G06F 9/45533; H04L 67/148
See application file for complete search history.

(56) References Cited

U.S. PATENT DOCUMENTS

| 8,615,579 B1 * | 12/2013 | Vincent | G06F 9/4856 709/224 |
|---|---|---|---|
| 9,092,252 B2 * | 7/2015 | Asayama | G06F 9/45558 |
| 9,575,781 B1 * | 2/2017 | Suit | G06F 9/455 |
| 9,870,268 B2 * | 1/2018 | Dippenaar | G06F 9/4856 |
| 10,263,842 B2 * | 4/2019 | Bursell | G06F 15/177 |
| 2007/0234337 A1 * | 10/2007 | Suzuki | G06F 8/61 717/168 |
| 2009/0007106 A1 * | 1/2009 | Araujo, Jr. | G06F 9/54 718/1 |
| 2009/0241030 A1 * | 9/2009 | von Eicken | H04L 67/00 715/735 |
| 2011/0085563 A1 * | 4/2011 | Kotha | H04L 41/0816 370/401 |
| 2011/0093849 A1 * | 4/2011 | Chawla | H04L 41/0816 718/1 |
| 2011/0161491 A1 * | 6/2011 | Sekiguchi | G06F 9/4856 709/224 |

(Continued)

OTHER PUBLICATIONS

"VSphere Virtual Machine Administration: Updated 1," technical documentation copyright VMWare, Inc., 2009-2012, 242 pages.

*Primary Examiner* — Dhairya A Patel
(74) *Attorney, Agent, or Firm* — Klarquist Sparkman, LLP

(57) ABSTRACT

A method of moving a virtual machine instance (VMI) from a first to a second host server computer in a multi-tenant network environment may include determining resources of the first host server computer running the VMI, acquiring state information for at least one of the resources used by the VMI while running on the first server computer, generating a plurality of migration profiles at different time points for the VMI using the determined resources and the acquired state information, receiving a selection of one of the plurality of migration profiles, terminating running of the VMI on the first host server computer, and launching the VMI on the second host server computer using the state information within the selected one of the plurality of migration profiles so as to move the VMI from the first to the second host server computer.

16 Claims, 10 Drawing Sheets

(56) References Cited

U.S. PATENT DOCUMENTS

| | | | |
|---|---|---|---|
| 2011/0202640 A1* | 8/2011 | Pillutla | G06F 9/4856 709/221 |
| 2011/0219372 A1* | 9/2011 | Agrawal | G06F 9/45558 718/1 |
| 2012/0272234 A1* | 10/2012 | Kaiser | G06F 11/3442 718/1 |
| 2013/0130651 A1* | 5/2013 | Deasy | H04W 76/10 455/411 |
| 2013/0262647 A1* | 10/2013 | Kurita | G06F 9/54 709/223 |
| 2013/0332982 A1* | 12/2013 | Rao | H04L 63/08 726/1 |
| 2014/0010110 A1* | 1/2014 | Zeng | H04L 41/0856 370/254 |
| 2014/0082614 A1* | 3/2014 | Klein | G06F 9/45558 718/1 |
| 2014/0082616 A1* | 3/2014 | Kurita | G06F 9/455 718/1 |
| 2014/0223556 A1* | 8/2014 | Bignon | H04L 63/1441 726/22 |
| 2015/0113530 A1* | 4/2015 | Arcese | G06F 9/45558 718/1 |

* cited by examiner

US 10,476,809 B1

MOVING VIRTUAL MACHINES USING MIGRATION PROFILES

BACKGROUND

Cloud computing is the use of computing resources (hardware and software) that are available in a remote location and accessible over a network, such as the Internet. In a computing environment with many computing devices, such as a virtual server or cloud computing environment with many server computers, the use of computing resources can provide a number of advantages including cost advantages and/or the ability to adapt rapidly to changing computing resource needs.

With the increased use of cloud computing resources, some cloud computing environments may be inefficient in managing resource allocation. Additionally, multiple application installations and reboots may cause latencies, contributing to the inefficient use of the cloud computing environment resources.

BRIEF DESCRIPTION OF THE DRAWINGS

Various embodiments in accordance with the present disclosure will be described with reference to the drawings, in which.

DETAILED DESCRIPTION

Figure 1:
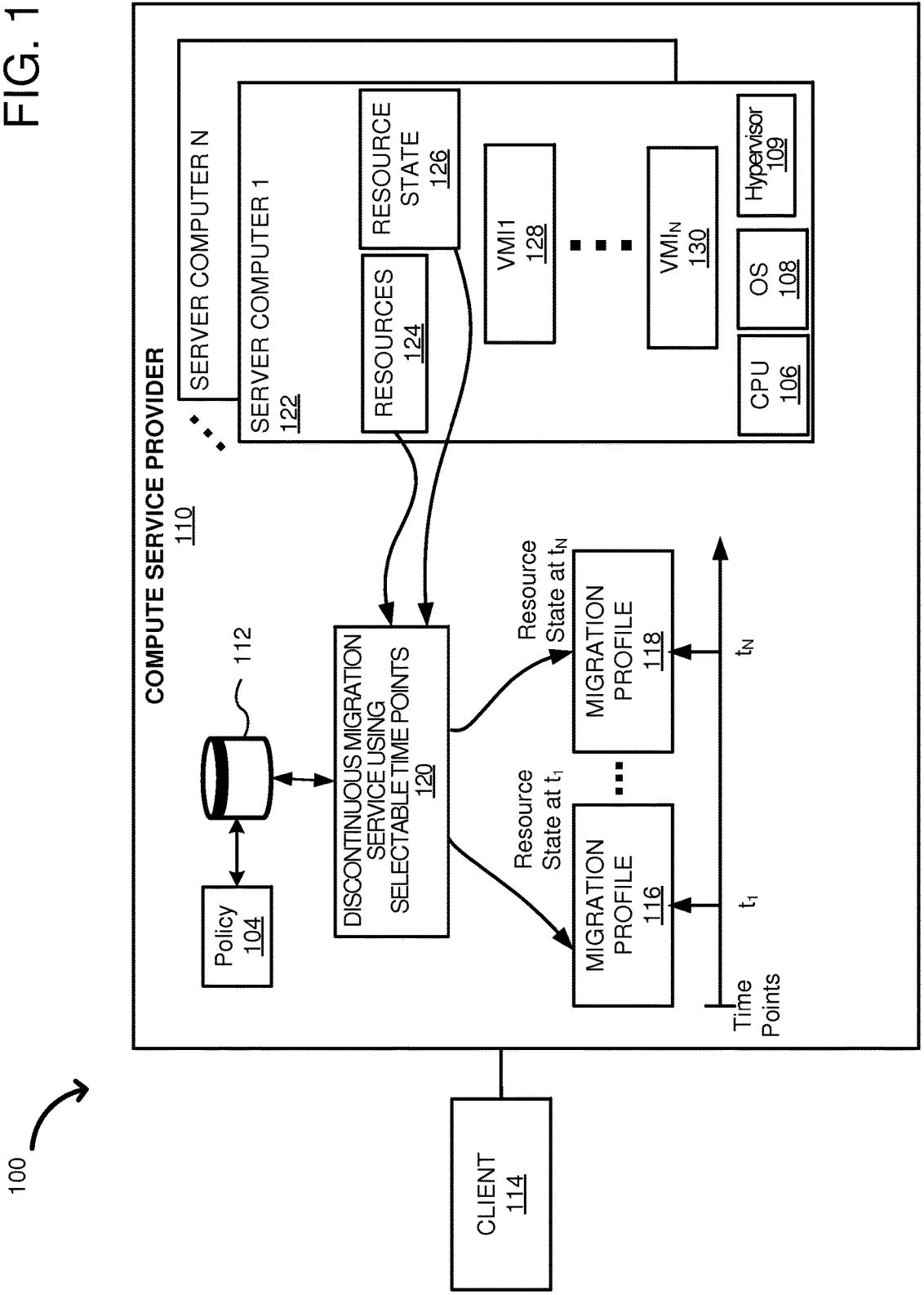
FIG. 1 is a diagram of an example network environment supporting moving virtual machines using migration profiles, in accordance with an embodiment of the disclosure.

A virtual machine image contains an operating system (e.g., Linux) and other data needed to launch a virtual machine in a virtual environment. The virtual machine image is similar to a physical computer's disk volume, and may include a file system, the operating system and other components needed to boot up as a machine. In order to launch a virtual machine, hardware needs to be selected. The hardware selection may be accomplished through instance types, which may allow a variety of different sizes of memory, CPU capacity, I/O performance, and so forth. The combination of the virtual machine image and the instance type can be used to create an "instance" or a virtual machine, which may be launched on a cloud computing resource, such as a host server computer in a multi-tenant network environment.

As used herein, the terms "virtual machine" and "virtual machine instance" are interchangeable.

As used herein, the term "snapshot" (e.g., an "instance snapshot") refers to the state of one or more resources of a virtual machine at a given point in time, which state information may be stored for subsequent use. The resources may include hardware resources of the server computer running the virtual machine (e.g., CPU, memory, disk storage or other type of storage, network card, and so forth) and/or software resources (e.g., one or more applications and/or operating system running on the virtual machine).

As used herein, the term "checkpoint" refers to a time-stamped snapshot of a virtual machine. For example, after a virtual machine snapshot is taken at a given time, the snapshot may be time-stamped (time of the snapshot is stored with the snapshot) to create a checkpoint.

As used herein, the term "migration profile" may include a time-stamped snapshot of a virtual machine (e.g., state information for one or more resources of the server computer running the virtual machine) as well as information on the resources of the server computer. In this regard, each migration profile is associated with a time point of creation. State information included in the profile may include, for example, memory registers state, disk volume state, CPU state, and so forth.

As used herein, the terms "moving" or "migrating" a virtual machine refer to moving a virtual machine from one server computer to another server computer (e.g., virtual machine is terminated, or otherwise suspended, from running at the current server computer and is launched at another server computer), or re-launching the virtual machine at the same server computer (e.g., virtual machine is terminated, or otherwise suspended, from running at the current server computer, state of one or more resources of the server computer may be changed, and the virtual machine may be re-launched at the same server computer).

The following description is directed to techniques and solutions supporting moving virtual machines using migration profiles in a network environment, such as a cloud computing multi-tenant network environment. To create a migration profile, the virtual machine instance may be snapshotted at a point in time, so that state information (e.g., memory and machine state) will be written to storage as part of the migration profile (e.g., external (off-server) storage). Versioning may be applied to a combination of the saved state information (e.g., memory/machine state and the disk volume(s) state attached to the instance), which combination will be unique (i.e., there will not be another instance with the same memory state/machine state/disk volume state/ version number combination). The migration profile may additionally include information on hardware and/or software resources associated with the server computer running the virtual machine. Once the instance checkpoint and the migration profile are created, the instance may continue to run on the server computer. At a later time, a new instance checkpoint (and a new migration profile) may be created again (the new migration profile including updated state information, resource information and a new version number or timestamp).

In this regard, a virtual machine instance may be migrated (e.g., from one server computer to another server computer, or re-launched at the same server computer) using one of a plurality of migration profiles associated with the virtual machine instance. For example, a user may be presented with a list of migration profiles, and since each migration profile includes resource information and resource state information (e.g., memory/machine and disk volume state), the virtual machine instance may be resumed from any of a plurality of available migration profiles.

FIG. 1 is a diagram of an example network environment supporting moving virtual machines using migration profiles, in accordance with an embodiment of the disclosure. Referring to FIG. 1, the example network environment 100 may comprise a client 114 and a compute service provider 110. The compute service provider 110 (which is discussed in greater detail in reference to FIG. 4 below) may comprise a plurality of host server computers 122 (e.g., server computer 1, N). The compute service provider 110 may be a multi-tenant cloud network environment where one or more clients (e.g., client 114) may run one or more virtual machine instances (VMIs) (e.g., VMIs 128, . . . , 130) on one or more of the server computers 122.

Each of the server computers 122 may comprise suitable logic, circuitry, interfaces, and/or code and may be operable to run the VMIs 128, . . . , 130 using computing resources 124. The resources 124 of each server computer 122 may comprise, for example, information identifying/describing the central processing unit (or CPU), memory (e.g., on-chip and/or off-chip memory), storage (e.g., disk storage, remote storage, and so forth), as well as any other computer resources used by each host server computer 122.

For each of the VMIs 128, . . . , 130, the resources 124 may be characterized with specific resource state information 126 associated with resource state for the VMI at a given time point. The resource state 126 may be implemented as a separate module operable to report state information for a given VMI running on the server computer 122 at a given time point. Alternatively, resource state information 126 may be obtained and reported by the CPU 106, the operating system (OS) 108, and/or the hypervisor 109 (which may have similar functionalities to the hypervisor 408 as described in reference to FIG. 4).

The discontinuous migration service with selectable time points 120 (hereinafter, "discontinuous migration service") within the compute service provider 110 may comprise suitable logic, circuitry, interfaces, and/or code and may be operable to generate and manage (e.g., store, edit and/or delete) one or more migration profiles (e.g., 116, . . . , 118). The discontinuous migration service 120 may also be operable to migrate (or cause another service, such as instance manager 206 in FIG. 2, to cause migration) of one or more of the VMIs 128, . . . , 130 to another server computer (or to re-launch a VMI on the same server computer) in accordance with resource information 124 and/or resource state information 126 stored in one or more of the migration profiles 116, . . . , 118. More specifically, the discontinuous migration service 120 may select one of a plurality of migration profiles (e.g., 116, 118) created at different time points ($t_1$, . . . , $t_N$) for purposes of launching a VMI using resources and state information associated with the selected migration profile. In this regard, the selection of migration profiles from a plurality of migration profiles may be based on, e.g., a time point the profile was created. Consequently, each migration profile may be incrementally different from another profile (as it is taken at a different time point), and discontinuous selection of migration profiles by the service 120 may be achieved with selectable time points (i.e., a migration profile for any available time point may be selected for migration or re-launching of a VMI).

For example, a client 114 may be using the computer service provider 110 to run a VMI 128 at server computer 1 of the plurality of server computers 122. The discontinuous migration service 120 may, at time point $t_1$, obtain resource information 124 (e.g., information on the CPU 108, the server computer 1 memory, disk storage, disk buffers, operating system 108, and/or other hardware and/or software resources being used by the VMI 128 while running on the server computer 1). The discontinuous migration service 120 may also obtain resource state information 126 at time $t_1$ (e.g., CPU state, memory state, disk buffers state, and so forth). The obtained resource information 124 and the resource state information 124 may then be used to generate the migration profile 116. The migration profile 116 may be indexed (e.g., time stamped using the time it was generated, $t_1$) and saved in the database 112. The discontinuous migration service 120 may also generate another migration profile (e.g., 118) at a subsequent time $t_N$ based on the resource information 124 and the resource state information 126 at time $t_N$. The migration profile 118 as well as any other profiles generated by the discontinuous migration service 120 may be stored in the database 112. Additionally, the discontinuous migration service 120 may generate the migration profiles during normal operation of a virtual machine instance (i.e., while the VMI is running), or the VMI may be temporarily instantaneously suspended so as to obtain the resource state information 126 and then resume operation of the VMI.

Even though reference numerals 124 and 126 in FIG. 1 are discussed as resource information and resource state information, respectively, these numerals may also refer to a module, block, and/or service providing the respective information. For example, a resources module (or service) 124 may comprise suitable circuitry, logic, and/or code and may be operable to provide information on one or more hardware and/or software resources used by the server computer 122 to run a VMI. Similarly, the resource state module (or service) 126 may comprise suitable circuitry, logic, and/or code and may be operable to provide resource state information for one or more of the resources.

The discontinuous migration service 120 may also provide the client 114 and/or the system administrator of the cloud service provider 110 functionalities for editing one or more of the migration profiles 116, . . . , 118 to add/delete metadata associated with such profiles (e.g., metadata on profile use restrictions, additional information of the VMI associated with a profile, and so forth).

In an example embodiment, the discontinuous migration service 120 may use a policy 104, which may describe one or more settings for automatic generation of migration profiles for a given customer, virtual machine and/or server computer. For example, the client 114 may set up the policy 104 so that migration profiles are generated every hour for each virtual machine paid for/controlled by the client 114. Policies for automatic deletion (or archiving) of migration profiles may also be set up by the client 114 and/or a system administrator of the cloud service provider 110. The policy document 104 may be stored in the database 112 used by the discontinuous migration service 120 or in any other storage accessible within the compute service provider 110.

Figure 2:
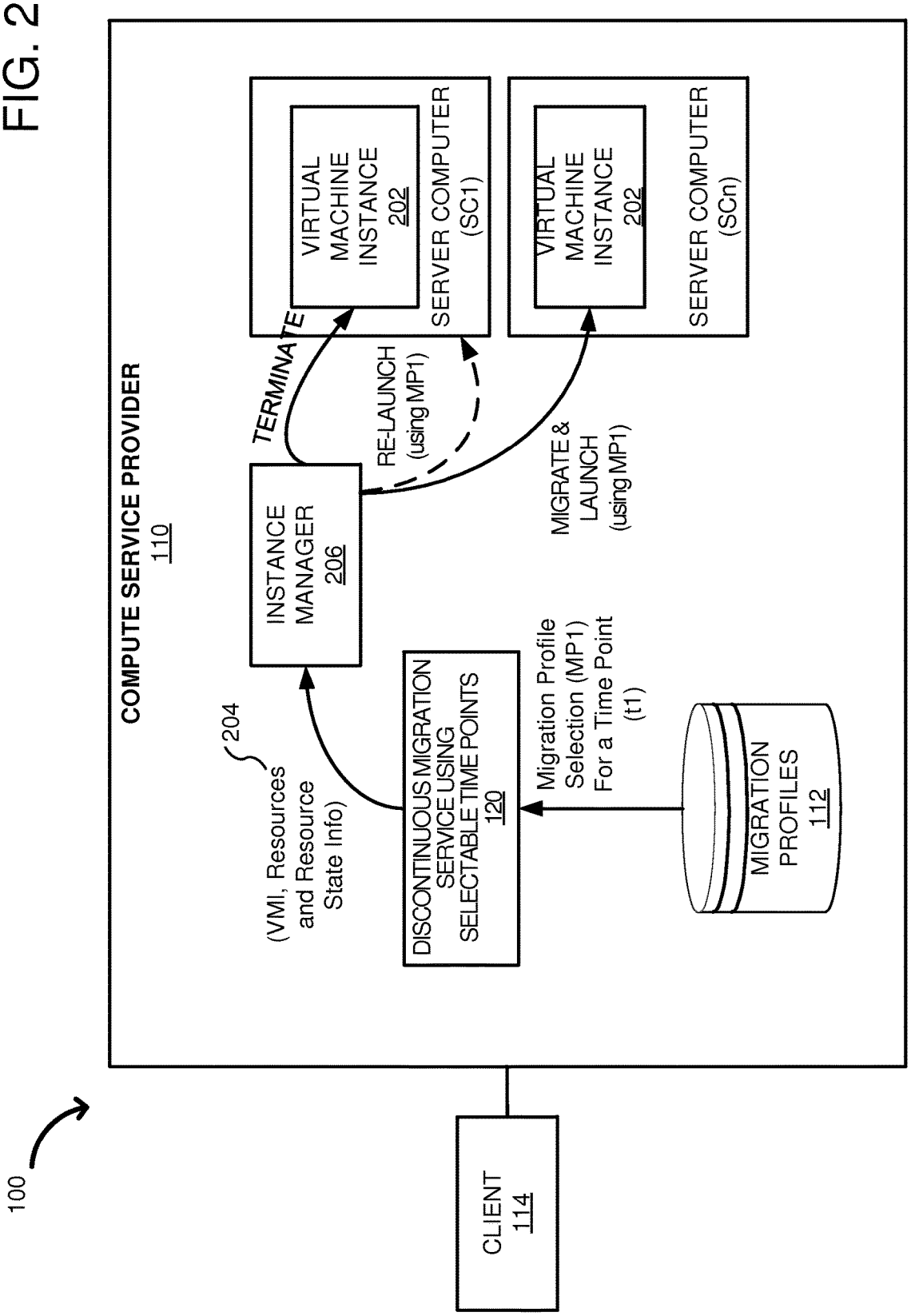
FIG. 2 is a block diagram of an example compute service environment with a migration service supporting moving virtual machines using migration profiles, in accordance with an embodiment of the disclosure.

FIG. 2 is a block diagram of an example compute service environment with a migration service supporting moving virtual machines using migration profiles, in accordance with an embodiment of the disclosure. Referring to FIG. 2, during an example VMI migration, the discontinuous migration service 120 may select a migration profile (e.g., MP1) from the profiles database 112. The discontinuous migration service 120 may use the received migration profile MP1 to obtain information identifying a VMI, resources information (e.g., hardware and/or software resources for the server computer running the VMI) and resource state information (e.g., 204), which may be communicated to the instance manager 206.

The instance manager 206 may comprise suitable circuitry, logic, and/or code and may be operable to manage one or more VMIs within the compute service provider 110. A more detailed description of the functionalities of the instance manager is provided herein below in reference to FIG. 5. After the instance manager receives the VMI identification information, the resources information, and the resource state information (collectively, 204), the instance manager may proceed with migration of the VMI. More specifically, the instance manager may identify the VMI associated with the migration profile MP1 as VMI 202 running on server computer SC1. The instance manager 206 may use the resources information to determine another server computer (e.g., server computer SCn), which is compatible with the resources requirements of the MP1 (e.g., SCn has the same, or similar, resources as specified by the resources information of MP1). After SCn is determined to be compatible with running the VMI 202, the instance manager 206 may terminate (or otherwise suspend) the VMI 202 from running on SC1 thus enforcing the global uniqueness of the VMI. The instance manager 206 may then use the resource state information within the MP1 to cause corresponding resources of SCn to have the same state as specified by MP1. The instance manager 206 may then launch the VMI 202 on SCn, thereby completing the VMI migration process.

In some instances (e.g., as mandated by a policy such as 104, by a user preference, and/or administrator preference), after the VMI 202 is terminated (or otherwise suspended), the instance manager 206 may re-launch the VMI 202 on the same server computer SC1 but using the resources state information from the MP1. Additionally, even though FIG. 2 illustrates that the migration of VMIs is performed by the instance manager 206, the present disclosure is not limited in this regard and the migration may be performed in part, or entirely, by the discontinuous migration service 120.

Figure 3:
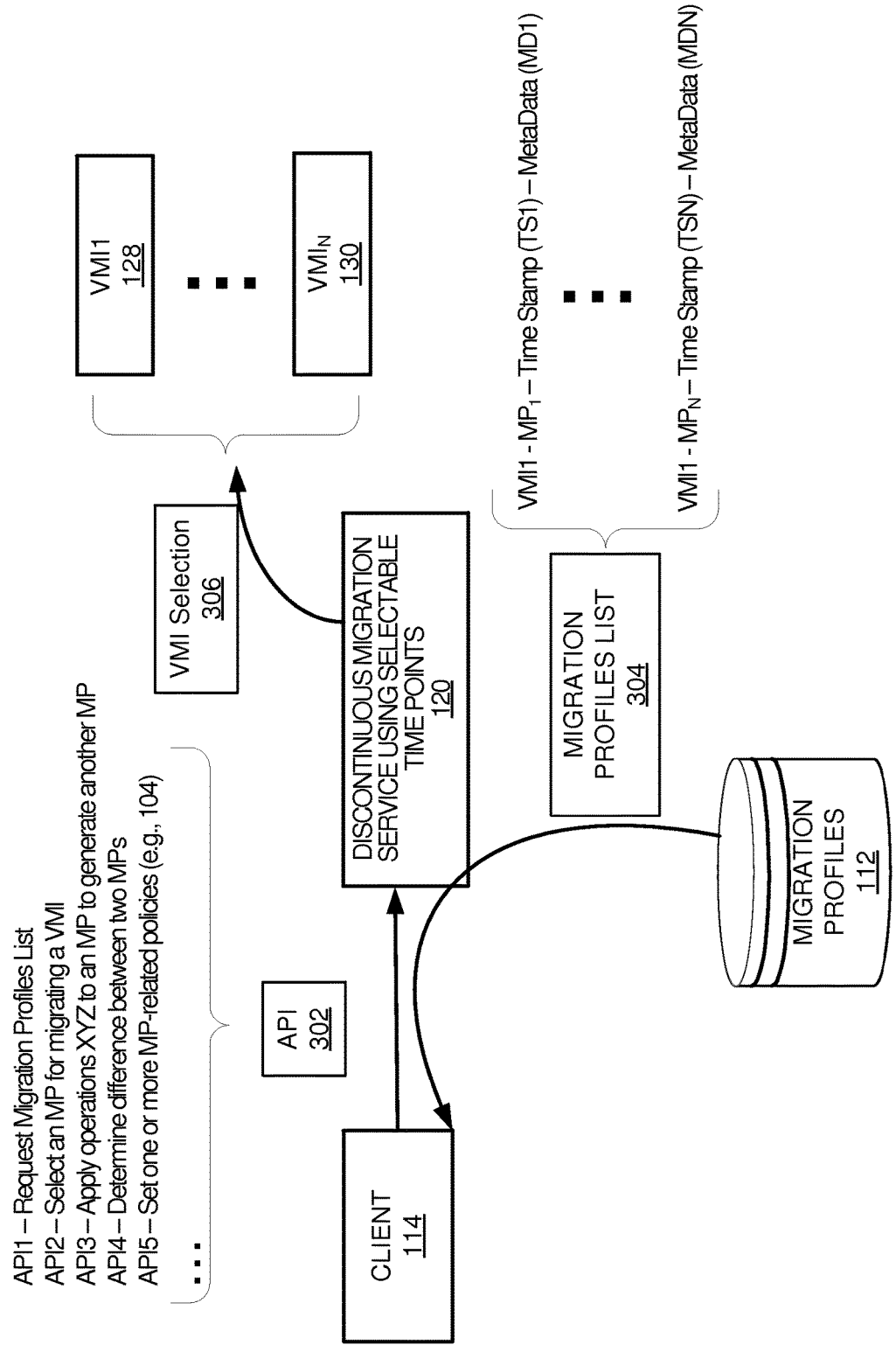
FIG. 3 is a diagram of an example network environment supporting moving of virtual machines in response to an API request, in accordance with various embodiments of the disclosure.

FIG. 3 is a diagram of an example network environment supporting moving of virtual machines in response to an API request, in accordance with various embodiments of the disclosure. Referring to FIG. 3, there is illustrated an example communication between a client 114 and the discontinuous migration service 120 in connection with moving (or migrating) virtual machines. For example, the client 114 may communicate an application programming interface (API) request 302 to the discontinuous migration service 120. The API request 302 may include one or more API requests, such as API1, . . . , API5 illustrated in FIG. 3. The API request API1 may be used by the client 114 to request a list of the migration profiles stored in the database 112. The migration profiles list 304 may be generated and communicated back to the client 114 as a response to API1. Each entry in the migration profiles list 304 may include information identifying the VMI, the migration profile number, a time stamp, and/or other metadata (e.g., information identifying the current server computer running the VMI, any comments entered by the client 114 or an administrator, any policy-related actions associated with the migration profile, such as automatic migration setting, and so forth).

The client 114 may use the API request API2 to select a migration profile (e.g., after the MP list 304 is communicated to the client 114). For example, the client 114 may select MP1 for VMI1 from the list 304. The VMI selection (e.g., 306) may be used by the discontinuous migration service 120 to select VMI1 128 for migration.

The API request API3 may be used by the client 114 in instances when the client would like to apply certain operations (indicated as operations X, Y, and Z in FIG. 3) to a migration profile in order to obtain another migration profile. For example, if the client 114 selects MP1 (associated with VMI1) from the list 304, the discontinuous migration service 120 may migrate VMI1 to another server computer (or re-launch VMI1 on the same server computer) using the resource state information from MP1. The discontinuous migration service 120 may then apply operations X, Y and Z to the migrated VMI1, and save the resulting resource state information (together with the resource information) in a new migration profile. In some instances, the operations "XYZ" may be associated with applying a patch to one migration profile in order to generate another migration profile. More specifically, a patch may be applied to one or more of a disk image (or a disk state), CPU registers state or memory content associated with state information of the migration profile MP1.

The API request API4 may be used by the client to select two migration profiles from the list 304 and request that the discontinuous migration service determine what is the difference between the profiles. For example, the discontinuous migration service 120 may determine one or more operations that would need to be applied to a VMI running with the resource state of the first migration profile so as to obtain the resource state associated with the second migration profile.

The API request API5 may be used by the client 114 to set up one or more of the migration profile-related policies 104. Even though only five API requests are illustrated in FIG. 3 (API1, . . . , API5), the disclosure is not limited in this regard and other API requests may also be utilized in connection with VMI migration functionalities performed by the discontinuous migration service 120.

Figure 4:
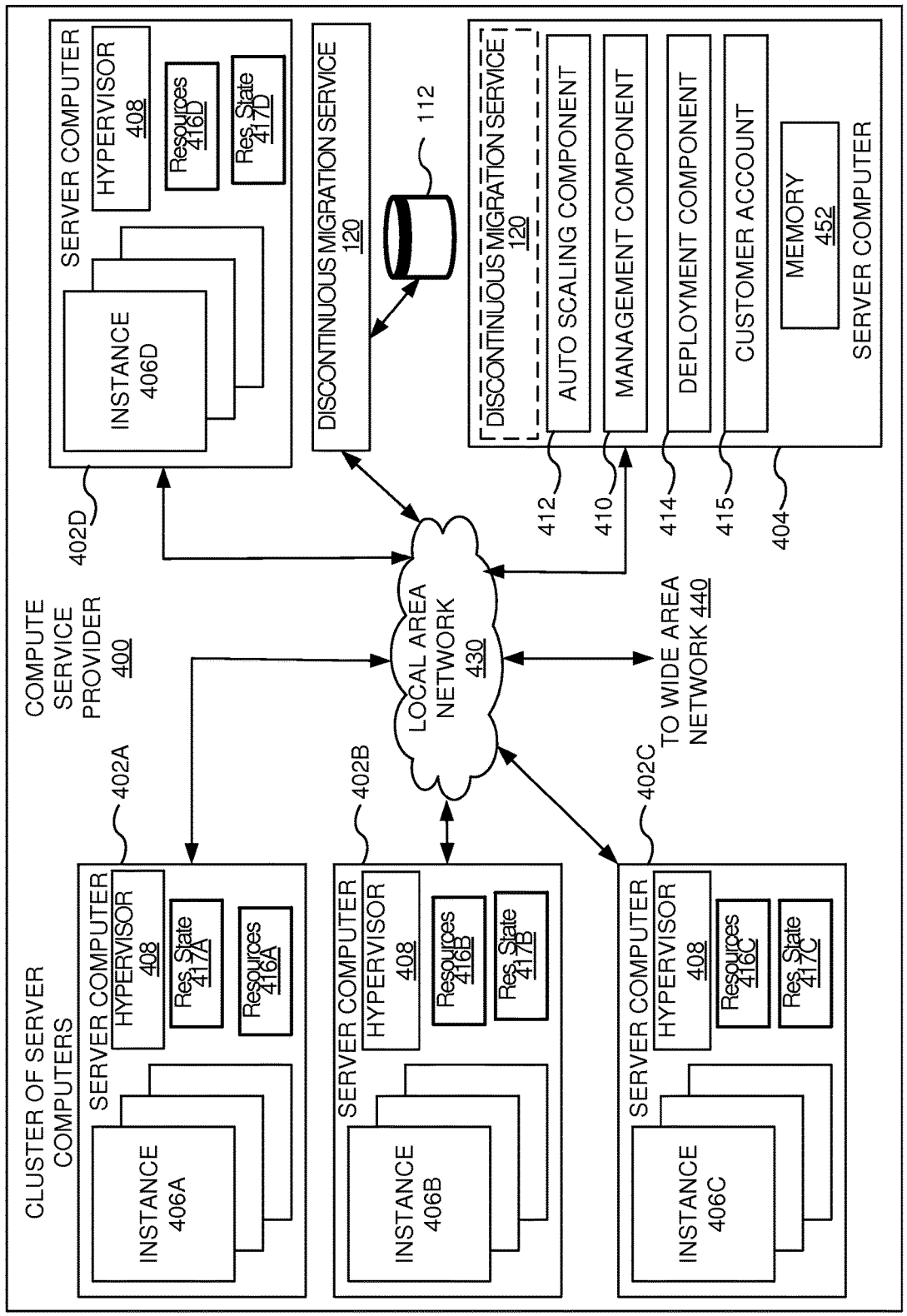
FIG. 4 is an example system diagram showing a plurality of virtual machine instances running in a multi-tenant environment, using a migration service, in accordance with an example embodiment of the disclosure.

FIG. 4 is an example system diagram showing a plurality of virtual machine instances running in a multi-tenant environment, using a migration service, in accordance with an example embodiment of the disclosure. More specifically, FIG. 4 is a computing system diagram of a network-based compute service provider 400 that illustrates one environment in which embodiments described herein can be used. By way of background, the compute service provider 400 (i.e., the cloud provider) is capable of delivery of computing and storage capacity as a service to a community of end recipients (e.g., tenants or customers).

In an example embodiment, the compute service provider 400 can be established for an organization by or on behalf of the organization. That is, the compute service provider 400 may offer a "private cloud environment." In another embodiment, the compute service provider 400 supports a multi-tenant environment, wherein a plurality of customers operate independently (i.e., a public cloud environment). Generally speaking, the compute service provider 400 can provide the following models: Infrastructure as a Service ("IaaS"), Platform as a Service ("PaaS"), and/or Software as a Service ("SaaS"). Other models can be provided. For the IaaS model, the compute service provider 400 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 400 using networked customer devices, such as desktop computers, laptops, tablets, smartphones, etc. running web browsers or other lightweight customer applications. Those skilled in the art will recognize that the compute service provider 400 can be described as a "cloud" environment.

The particular illustrated compute service provider 400 includes a plurality of server computers 402A-402D. While only four server computers are shown, any number can be used, and large centers can include thousands of server computers. The server computers 402A-402D can provide computing resources for executing software instances 406A-406D. In one embodiment, the instances 406A-406D are virtual machines. As known in the art, a virtual machine is an instance of a software implementation of a machine (i.e., a computer) that executes applications like a physical machine. In the example, each of the server computers 402A-402D can be configured to execute a hypervisor 408 or another type of program configured to enable the execution of multiple instances 406 on a single server. For example, each of the servers 402A-402D can be configured (e.g., via the hypervisor 408) to support one or more virtual machine partitions, with each virtual machine partition capable of running a virtual machine instance (e.g., server computer 402A could be configured to support three virtual machine partitions each running a corresponding virtual machine instance). Additionally, each of the instances 406 can be configured to execute one or more applications.

In an example embodiment, each of the server computers 402A-402D may also comprise resources module (416A-416D) and resource state module (417A-417D). The resources module 416 may comprise suitable circuitry, logic, and/or code and may be operable to provide information on hardware and/or software resources within the server computer 402. The resources state module 417 may comprise suitable circuitry, logic, and/or code and may be operable to provide state information for one or more of the hardware and/or software resources of the server computer 402 at a given point in time. Functionalities of the modules 416 and 417 are similar to the functionalities of modules 124 and 126, respectively, as discussed above in reference to FIG. 1.

Figure 5:
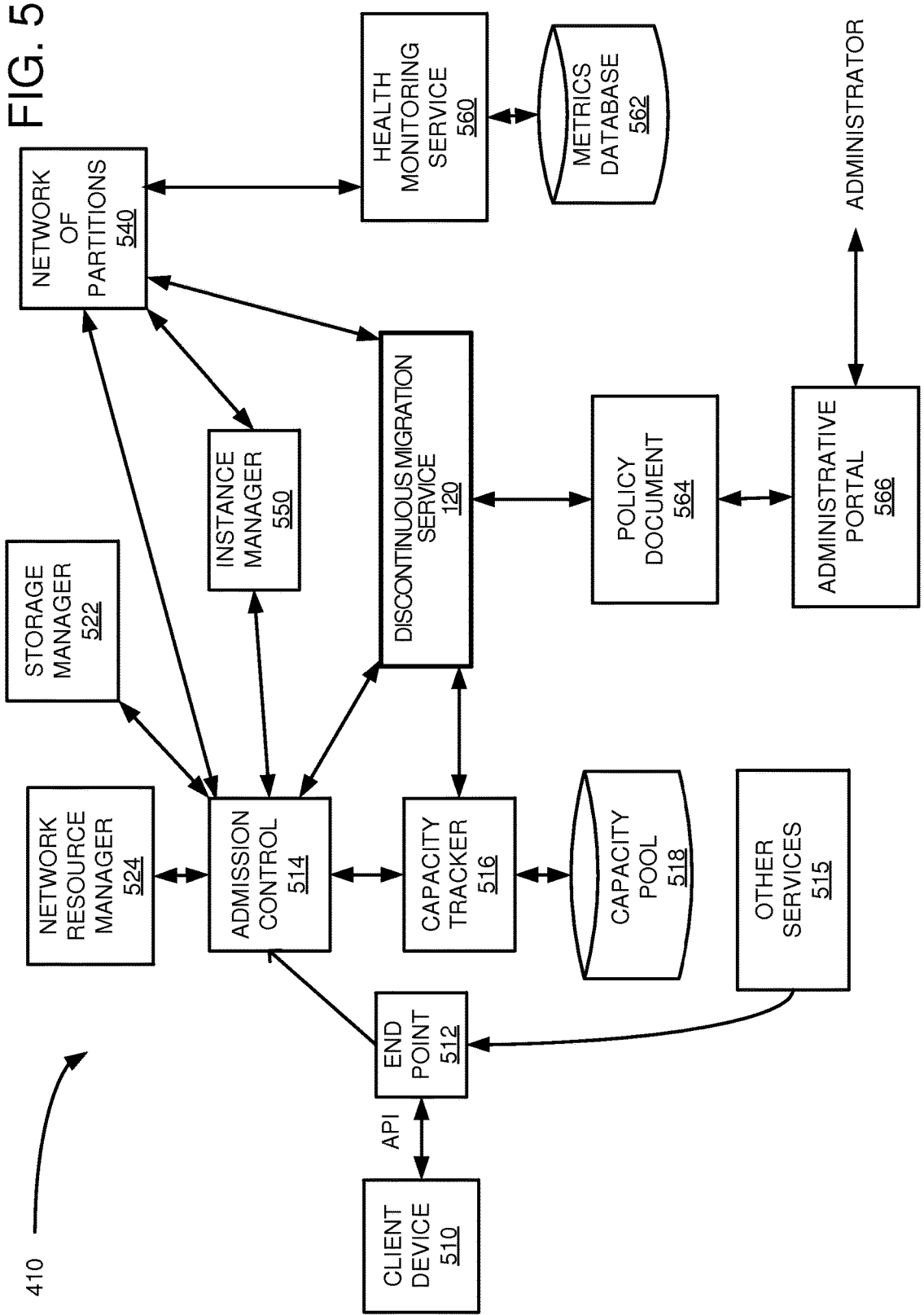
FIG. 5 shows further details of an example system including a plurality of management components associated with a control plane, which may be used to migrate one or more virtual machine instances according to one embodiment.

The compute service provider 400 may also comprise a discontinuous migration service 120. The discontinuous migration service 120 may comprise suitable circuitry, logic, and/or code and may be operable to perform the functionalities described herein (e.g., in reference to FIGS. 1-3) including generating migration profiles, storing the migration profiles in database 112, managing the migration profiles, and migrating one or more virtual machine instances (e.g., 406) from one server computer to another or re-launching the VMI on the same server computer using the resource state information within a selected migration profile. The discontinuous migration service 120 may be implemented as a stand-alone service within the provider 400, as a dedicated server (similar to the servers 402A-402D), and/or may be implemented as part of the server computer 404 that performs management functions. For example, the discontinuous migration service 120 may be implemented as part of the management component 410 (as seen in FIG. 5).

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 404 can be reserved for executing software components for managing the operation of the server computers 402, the instances 406, the hypervisors 408, and/or the discontinuous migration service 120. For example, the server computer 404 can execute a management component 410. A customer can access the management component 410 to configure various aspects of the operation of the instances 406 purchased by the customer. For example, the customer can purchase, rent or lease instances and make changes to the configuration of the instances. The customer can also specify settings regarding how the purchased instances are to be scaled in response to demand. The management component 410 can further include a policy document (e.g., 564 in FIG. 5) to implement customer policies, such as the policies 104 related to the discontinuous migration service 120.

The server computer 404 may further comprise memory 452, which may be used as processing memory by the discontinuous migration service 120. An auto scaling component 412 can scale the instances 406 based upon rules defined by the customer. In one embodiment, the auto scaling component 412 allows a customer to specify scale-up rules for use in determining when new instances should be instantiated and scale-down rules for use in determining when existing instances should be terminated. The auto scaling component 412 can consist of a number of subcomponents executing on different server computers 402 or other computing devices. The auto scaling component 412 can monitor available computing resources over an internal management network and modify resources available based on need.

A deployment component 414 can be used to assist customers in the deployment of new instances 406 of computing resources. The deployment component can have access to account information associated with the instances, such as who is the owner of the account, credit card information, country of the owner, etc. The deployment component 414 can receive a configuration from a customer that includes data describing how new instances 406 should be configured. For example, the configuration can specify one or more applications to be installed in new instances 406, provide scripts and/or other types of code to be executed for configuring new instances 406, provide cache logic specifying how an application cache should be prepared, and other types of information. The deployment component 414 can utilize the customer-provided configuration and cache logic to configure, prime, and launch new instances 406. The configuration, cache logic, and other information may be specified by a customer using the management component 410 or by providing this information directly to the deployment component 414. The instance manager (e.g., 550 in FIG. 5) can be considered part of the deployment component 414.

Customer account information 415 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, and so forth.

A network 430 can be utilized to interconnect the server computers 402A-402D and the server computer 404. The network 430 can be a local area network (LAN) and can be connected to a Wide Area Network (WAN) 440 so that end-users can access the compute service provider 400. It should be appreciated that the network topology illustrated in FIG. 4 has been simplified and that many more networks and networking devices can be utilized to interconnect the various computing systems disclosed herein.

FIG. 5 shows further details of an example system including a plurality of management components associated with a control plane, which may be used to migrate one or more virtual machine instances according to one embodiment. More specifically, FIG. 5 illustrates in further detail the management component 410, which may implement the discontinuous migration service 120 within the multi-tenant environment of the compute service provider 400.

In order to access and utilize instances (such as instances 406 of FIG. 4), a customer device can be used. The customer device 510 can be any of a variety of computing devices, mobile or otherwise, including a cell phone, smartphone, handheld computer, Personal Digital Assistant (PDA), desktop computer, etc. The customer device 510 can communicate with the compute service provider 400 through an end point 512, which can be a DNS address designed to receive and process application programming interface (API) requests. In particular, the end point 512 can be a web server configured to expose an API. Using the API requests (e.g., 302 in FIG. 3), a customer device 510 can make requests to implement any of the functionality described herein (e.g., request a migration profile list, select a migration profile to migrate a VMI, apply certain operations to an existing migration profile to generate another profile, set one or more migration profile-related policies, and so forth). Other services 515, which can be internal to the compute service provider 400, can likewise make API requests to the end point 512. For example, the customer device 510 may use the API requests (e.g., 302 in FIG. 3) to communicate a customer request associated with a migration profile. The API requests (e.g., 302) from the client 114 can pass through the admission control 514 and onto the discontinuous migration service 120 in order to access the policy document 564 (which is similar to 104) and/or to request migration-related services. An administrative portal 566 can be used to access and make changes to the policy document 564 by an administrator of either the customer or the compute service provider 300.

Other general management services that may or may not be included in the compute service provider 400 (and/or within the management component 410) include an admission control 514, e.g., one or more computers operating together as an admission control web service. The admission control 514 can authenticate, validate and unpack the API requests for service or storage of data within the compute service provider 400. The capacity tracker 516 is responsible for determining how the servers need to be configured in order to meet the need for the different instance types by managing and configuring physical inventory in terms of forecasting, provisioning, and real-time configuration and allocation of capacity. The capacity tracker 516 maintains a pool of available inventory in a capacity pool database 518. The capacity tracker 516 can also monitor capacity levels so as to know whether resources are readily available or limited.

An instance manager 550 controls launching and termination of virtual machine instances in the network. When an instruction is received (such as through an API request) to launch an instance, the instance manager 550 pulls resources from the capacity pool 518 and launches the instance on a decided upon host server computer. Similar to the instance manager are the storage manager 522 and the network resource manager 524. The storage manager 522 relates to initiation and termination of storage volumes, while the network resource manager 524 relates to initiation and termination of routers, switches, subnets, etc. A network of partitions 540 is described further in relation to FIG. 6, and includes a physical layer upon which the instances are launched.

The discontinuous migration service 120 may perform the migration-related functionalities described herein. The digital certificate service 120 may communicate with the capacity tracker 516 to receive information regarding available partitions and/or host servers that can be used for migrating and launching an instance (or other network resources requested by a customer entity). Additionally, communications with the admission control 514 may be used to launch (or re-launch) an instance in accordance with a migration profile, and communications with the network of partitions 540 may be used to perform migration-related functionalities affecting a plurality of partitions (e.g., a plurality of instances running on such partitions associated with one or more server computers).

Figure 6:
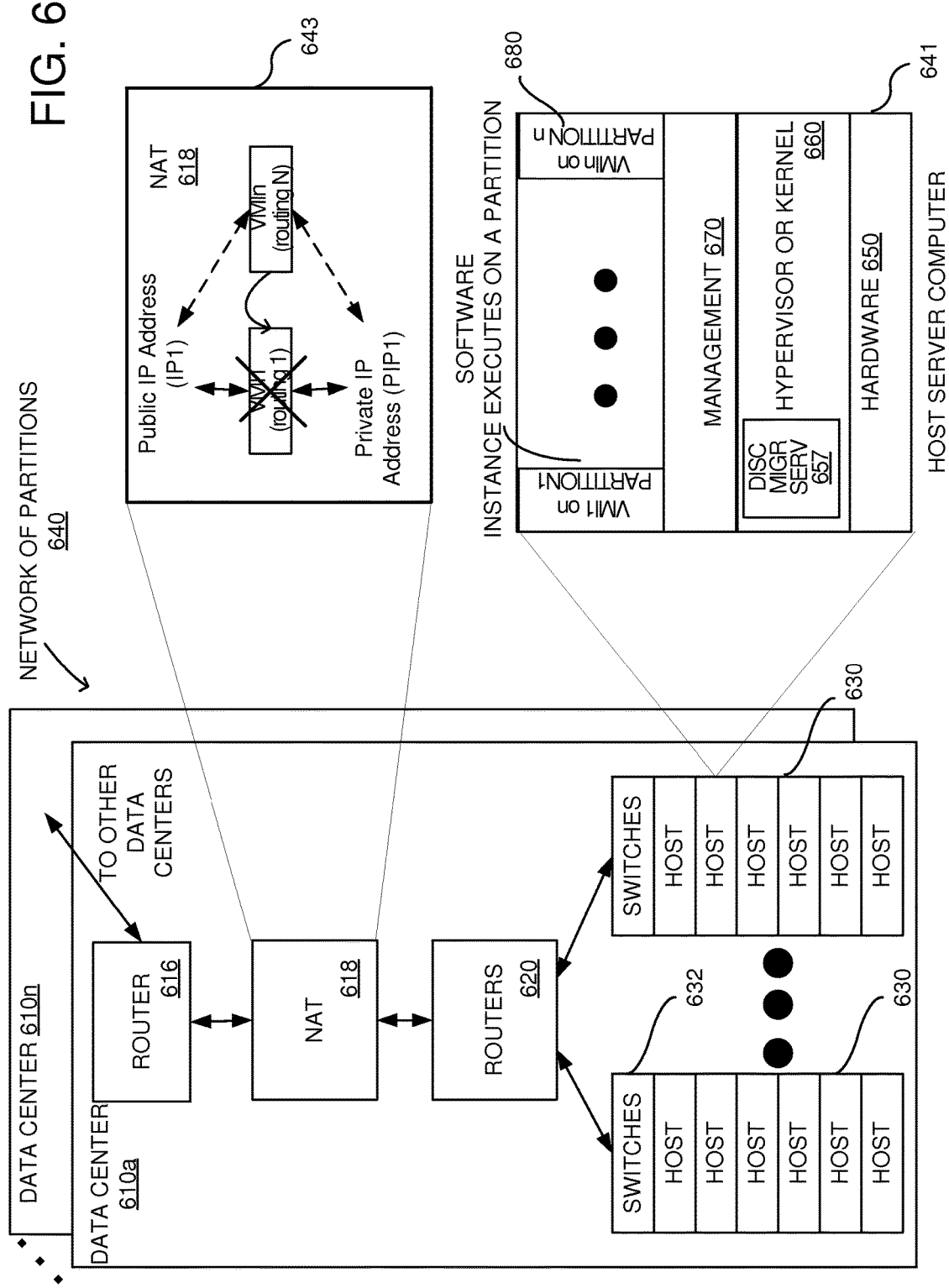
FIG. 6 shows an example of a plurality of host computers, routers, and switches—which are hardware assets used for running virtual machine instances—with the host computers having migration-related functionalities that may be configured according to one embodiment.

FIG. 6 shows an example of a plurality of host computers, routers, and switches—which are hardware assets used for running virtual machine instances—with the host computers having migration-related functionalities that may be configured according to one embodiment. More specifically, FIG. 6 illustrates the network of partitions 640 and the physical hardware associated therewith. The network of partitions 640 can include a plurality of data centers, such as data centers 610a, . . . , 610n, coupled together by routers, such as router 616.

The router 616 reads address information in a received packet and determines the packet's destination. If the router decides that a different data center contains a host server computer, then the packet is forwarded to that data center. If the packet is addressed to a host in the data center 610a, then it is passed to a network address translator (NAT) 618 that converts the packet's public IP address to a private IP address. The NAT 618 also translates private addresses to public addresses that are bound outside of the data center 610a. Additional routers 620 can be coupled to the NAT 618 to route packets to one or more racks 630 of host server computers. Each rack 630 can include a switch 632 coupled to multiple host server computers. A particular host server computer is shown in an expanded view at 641.

Each host 641 has underlying hardware 650, which may include a network interface card, one or more CPUs, memory, and so forth (not illustrated in FIG. 6). Running a layer above the hardware 650 is a hypervisor or kernel layer 660. The hypervisor or kernel layer 660 can be classified as a type 1 or type 2 hypervisor. A type 1 hypervisor runs directly on the host hardware 650 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can also be used.

A management layer 670 can be part of the hypervisor or separated therefrom, and generally includes device drivers needed for accessing the hardware 650. The partitions 680 are logical units of isolation by the hypervisor. Each partition 680 can be allocated its own portion of the hardware layer's memory, CPU allocation, storage, etc. Additionally, each partition can include a virtual machine and its own guest operating system (e.g., VMI1 may be running on partition 1 and VMIn may be running on partition n). As such, each partition 680 is an abstract portion of capacity designed to support its own virtual machine independent of the other partitions.

In accordance with an example embodiment of the disclosure, discontinuous migration service functionalities 657 may be part of the hypervisor 660 and may be used to implement VMI migration-related functionalities as described herein. The discontinuous migration service functionalities 657 may include the functionalities associated with, for example, the discontinuous migration service 120, the resources module 124, and/or the resource state module 126.

Additionally, when a virtual machine instance (e.g., VMI1) is migrated (e.g., re-launched on the same host as VMIn or launched as VMIn on a partition at another host server computer), the newly launched VMIn will be associated with the same public and private IP addresses as was used for VMI1. This is illustrated at the expanded view 643 of the NAT 618. As seen at 643, even though each VMI (or each server running the VMI) may be associated with its own private IP address, after the migration takes place (e.g., VMI1 is terminated (or suspended) and replaced with VMIn, as VMIn is launched at the same or different host server computer), the newly launched VMIn has the same public IP address (e.g., IP1) and private IP address (PIP1) as previously used by the terminated (or suspended) VMI1. Additionally, routing information (i.e., routing information for the specific server computer hosting the VMI) may remain different (e.g., routing information "routing 1" is associated with VMI1 and routing information "routing n" is associated with VMIn) even though private and public IP addresses of VMI1 and VMIn after the migration remain the same.

Figure 7:
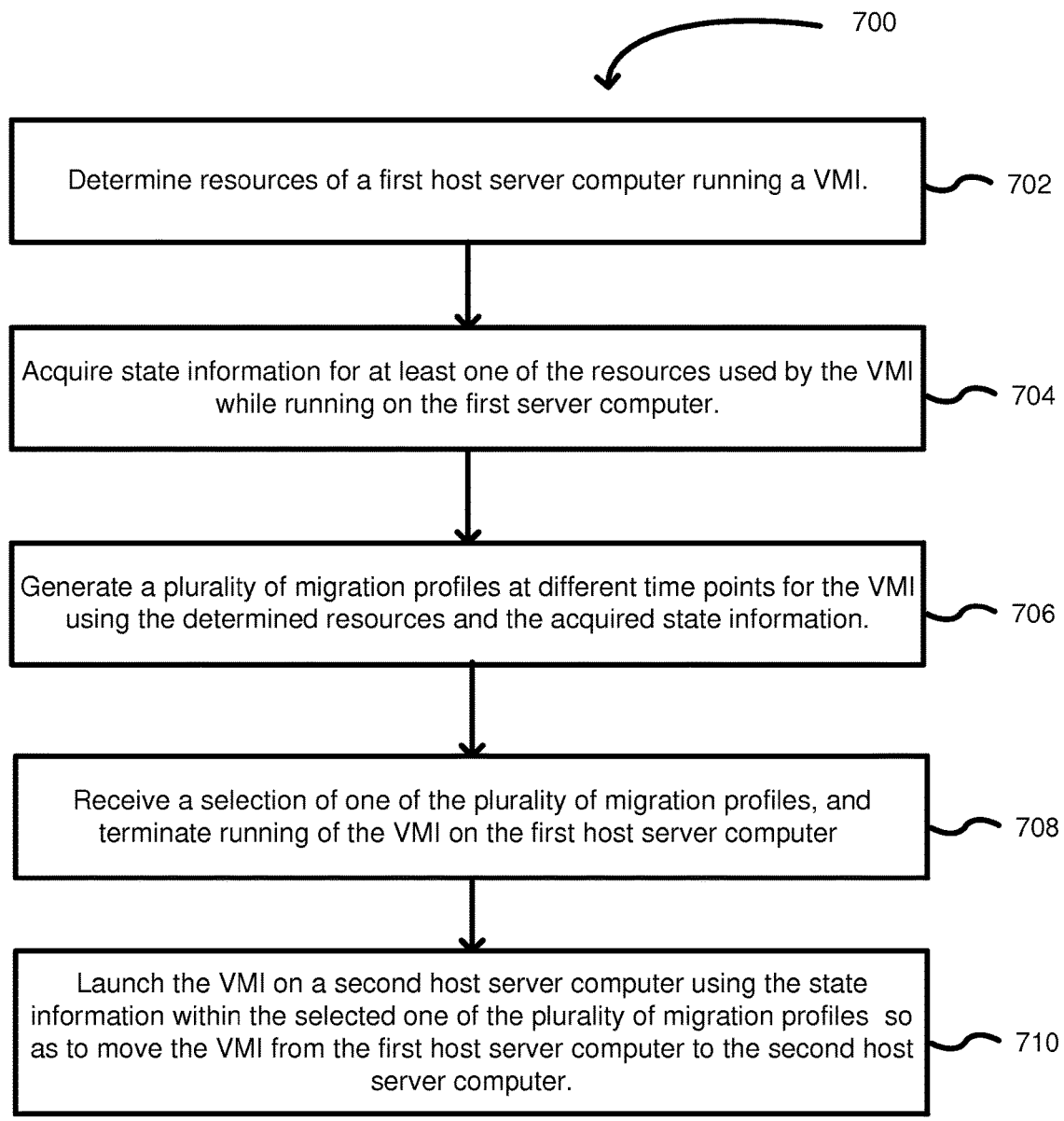
FIG. 7 is a flowchart of an example method of moving a virtual machine instance (VMI) from a first host server computer to a second host server computer, in accordance with an embodiment of the disclosure.

FIG. 7 is a flowchart of an example method of moving a virtual machine instance (VMI) from a first host server computer to a second host server computer, in accordance with an embodiment of the disclosure. Referring to FIGS. 1-3 and 7, the example method 700 may start at 702, when resources of a first host server computer running the VMI may be determined. For example, VMI 202 may be running on server computer SC1. The discontinuous migration service 120 may use the resources module 124 to determined hardware and/or software resources of the first host server computer (SC1) associated with running VMI 202. The hardware resources may include, for example, CPU, memory, disk storage, disk buffers, and so forth. The software resources may include, for example, one or more applications running on the host server computer, a host operating system, and so forth.

At 704, state information may be acquired for at least one of the resources used by the VMI while running on the first server computer. For example, the discontinuous migration service 120 may use the resource state module 126 to acquire state information for one or more of the hardware and/or software resources at a certain time point. At 706, a plurality of migration profiles for the VMI may be generated at different time points, using the determined resources and the acquired state information. As shown in FIG. 1, at time point $t_1$, the discontinuous migration service 120 may obtain resources information from the resource module 124 and resource state information from the resource state module 126, which may be used in generating migration profile 116. Similarly, at time point $t_N$, the discontinuous migration service 120 may obtain resources information from the resource module 124 and resource state information from the resource state module 126, which may be used in generating migration profile 118.

At 708, a selection of one of the plurality of migration profiles may be received, and running of the VMI on the first host server computer may be terminated (or otherwise suspended). For example, the client 114 may have communicated an API request 302 selecting one of the plurality of migration profiles identified on the list 304. The selected migration profile may provide information on which VMI should be migrated (e.g., identifying VMI 202 running on SC1). The discontinuous migration service 120 may then terminate (or otherwise suspend) running the VMI 202 on SC1 and, at 710, the VMI 202 may be launched on a second host server computer (e.g., SCn) using the state information within the selected one of the plurality of migration profiles so as to move the VMI 202 from the first host server computer (SC1) to the second host server computer (SCn).

The second host server computer SCn may be selected from a plurality of host server computers within the multi-tenant network environment (e.g., compute service provider 110) by matching resources of the second host server computer with the determined resources within the migration profile. For example, the discontinuous migration service 120 may identify the resources specified in the selected migration profile (i.e., the SC1 hardware and/or software resources associated with running the VMI 202), and may determine another host server computer (e.g., SCn) which matches these resources (e.g., same or similar CPU, memory, disk storage, operating system, and so forth). After the migration of VMI 202 from SC1 to SCn has taken place, the discontinuous migration service 120 may assign (or notify another module, such as the instance manager 550, to assigning) an external IP address to the second host server computer (SCn) that is the same as an external IP address for the first host server computer (SC1), as illustrated in FIG. 6.

Figure 8:
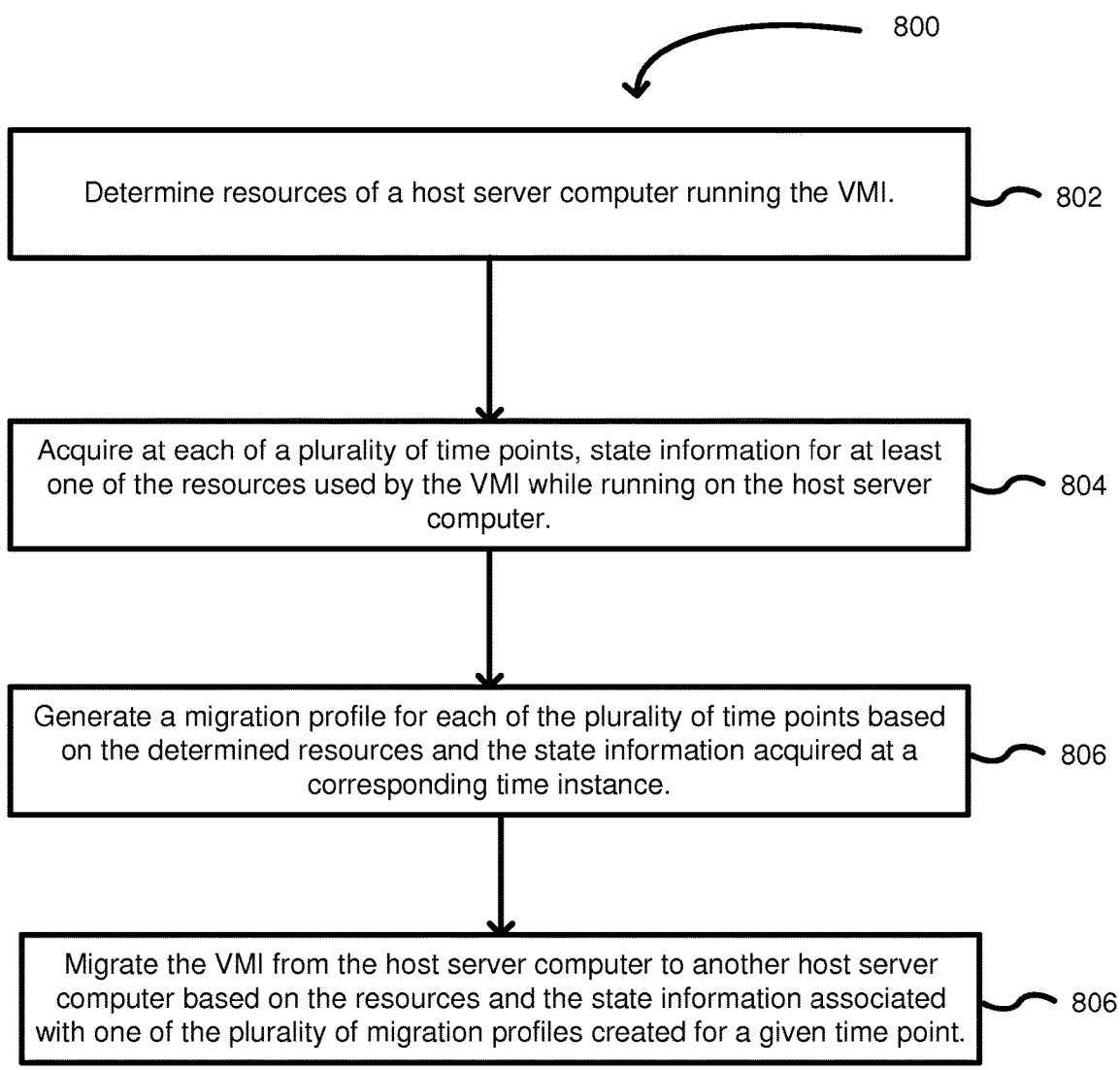
FIG. 8 is a flowchart of another example method of moving virtual machine instances, in accordance with an embodiment of the disclosure.

FIG. 8 is a flowchart of another example method of moving virtual machine instances, in accordance with an embodiment of the disclosure. Referring to FIGS. 1-3 and 8, the example method 800 may start at 802, when resources of a host server computer running the VMI may be determined. For example, VMI 202 may be running on server computer SC1. The discontinuous migration service 120 may use the resources module 124 to determined hardware and/or software resources of the first host server computer (SC1) associated with running VMI 202. The hardware resources may include, for example, CPU, memory, disk storage, disk buffers, and so forth. The software resources may include, for example, one or more applications running on the host server computer, a host operating system, and so forth.

At 804, state information for at least one of the resources used by the VMI while running on the host server computer may be acquired at each of a plurality of time points. For example, the discontinuous migration service 120 may use the resource state module 126 to acquire state information for one or more of the hardware and/or software resources at time points $t_1, \ldots, t_N$.

At 806, a migration profile for each of the plurality of time points may be generated based on the determined resources and the state information acquired at a corresponding time point. As shown in FIG. 1, at time point $t_1$, the discontinuous migration service 120 may obtain resources information from the resource module 124 and resource state information from the resource state module 126, which may be used in generating migration profile 116. Similarly, at time point $t_N$, the discontinuous migration service 120 may obtain resources information from the resource module 124 and resource state information from the resource state module 126, which may be used in generating migration profile 118. Each of the plurality of generated migration profiles (e.g., 116, . . . , 118) may be indexed according to the corresponding time point the state information was acquired (e.g., time points $t_1, \ldots, t_N$). The indexed plurality of migration profiles may then be stored in the migration profiles database 112 within the compute service provider 110.

The discontinuous migration service 120 may select another host server computer (e.g., SCn) from a plurality of host server computers (122) within the compute service provider 110 by matching resources of the host server computer SCn with the determined resources within a selected migration profile (e.g., MP1 in migration profile list 304). For example, the discontinuous migration service 120 may identify the resources specified in the selected migration profile (i.e., the SC1 hardware and/or software resources associated with running the VMI 202), and may determine the another host server computer (e.g., SCn) which matches these resources (e.g., same or similar CPU, memory, disk storage, operating system, and so forth).

Prior to migration, the discontinuous migration service 120 may terminate (or otherwise suspend) running of the VMI 202 on the host server computer SC1. At 806, the discontinuous migration service 120 may migrate the VMI 202 from the host server computer SC1 to host server computer SCn based on the resources and the state information associated with the migration profile. After the migration of VMI 202 from SC1 to SCn has taken place, the discontinuous migration service 120 may assign (or notify another module, such as the instance manager 550, to assigning) an external IP address to the second host server computer (SCn) that is the same as an external IP address for the first host server computer (SC1), as illustrated in FIG. 6.

Figure 9:
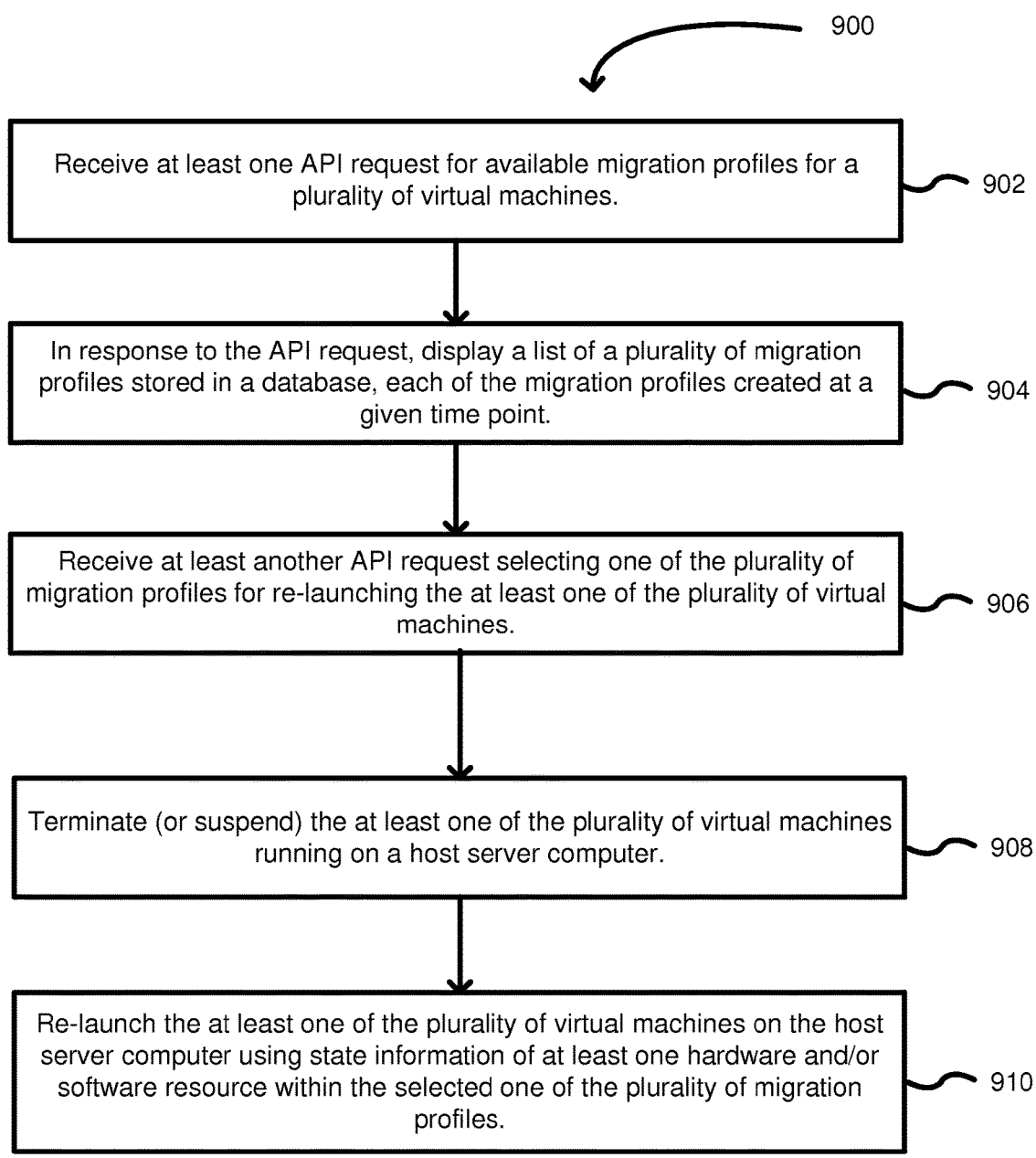
FIG. 9 is a flowchart of yet another example method of moving virtual machine instances, in accordance with an embodiment of the disclosure.

FIG. 9 is a flowchart of yet another example method of moving virtual machine instances, in accordance with an embodiment of the disclosure. Referring to FIGS. 1-3 and 9, the example method 900 may start at 902, when at least one API request for available migration profiles may be received. For example, the discontinuous migration service 120 may receive an API request 302 (e.g., API1), requesting a list of the available migration profiles. The discontinuous migration service 120 may generate the list 304 of a plurality of migration profiles created at different time points and stored in the database 112. At 904, in response to the API1 request, the discontinuous migration service 120 may display the list 304 to the client 114, or may communicate the list 304 to the client 114.

At 906, the discontinuous migration service 120 may receive at least another API request (e.g., API request API5) selecting one of the plurality of migration profiles (created at a given time point) from the list 304 of the generated plurality of migration profiles. In this regard, the selection of migration profiles from a plurality of migration profiles may be based on, e.g., a time point the profile was created. In this regard, discontinuous selection of migration profiles may be possible, where a migration profile for any available time instance may be selected for migration (or re-launching) of a VMI. For example, the API request API5 may select migration profile MP1 for re-launching VMI (e.g., VMI 202) on the same server computer (e.g., SC1). At 908, the discontinuous migration service 120 may initially suspend VMI 202 from running on the server computer SC1. The discontinuous migration service 120 may then obtain resource state information saved in the migration profile MP1, and may change (or request another module such as instance manager 206) to change the current state information of SC1 resources to state information from the profile MP1. At 910, after the state information has been updated, the discontinuous migration service 120 may re-launch the VMI 202 on the same host server computer SC1.

Figure 10:
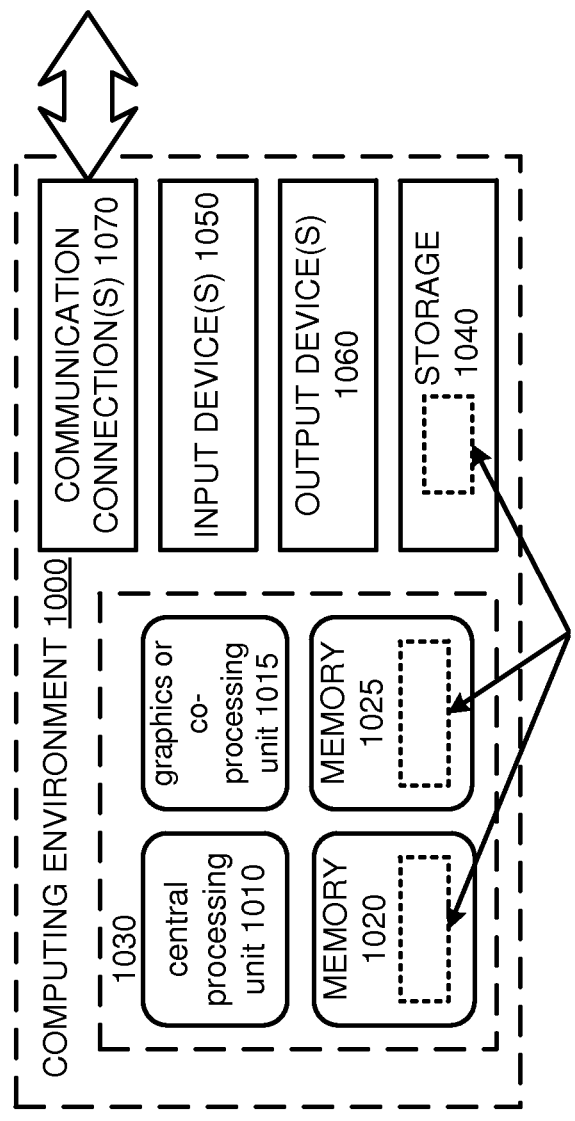
FIG. 10 depicts a generalized example of a suitable computing environment in which the described innovations may be implemented.

FIG. 10 depicts a generalized example of a suitable computing environment in which the described innovations may be implemented. Referring to FIG. 10, the computing environment 1000 is not intended to suggest any limitation as to scope of use or functionality, as the innovations may be implemented in diverse general-purpose or special-purpose computing systems. For example, the computing environment 1000 can be any of a variety of computing devices (e.g., desktop computer, laptop computer, server computer, tablet computer, etc.)

With reference to FIG. 10, the computing environment 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations (e.g., functionalities) described herein, in the form of computer-executable instructions suitable for execution by the processing unit(s).

A computing system may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing environment 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing environment 1000. The output device(s) 1060 may be a display, printer, speaker, CD-writer, or another device that provides output from the computing environment 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a customer-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. Therefore, what is claimed as the invention is all that comes within the scope of these claims.

What is claimed is:

1. A non-transitory computer-readable storage medium including instructions thereon that upon execution by one or more processors, cause a computer system to:
   determine a resource of a first host server computer running a virtual machine instance (VMI) associated with a tenant in a multitenant network environment;
   acquire first state information for the resource used by the VMI while running on the first host server computer at a first time point;
   acquire second state information for the resource used by the VMI while running on the first host server computer at a second time point;
   generate, according to a policy associated with the tenant including one or more settings for automatically generating migration profiles, a first migration profile using the determined resource and the first state information for the VMI and a second migration profile using the determined resource and the second state information for the VMI;
   index the first migration profile and the second migration profile according to the first time point and the second time point and the state information acquired at the first time point and at the second time point;
   store the indexed first migration profile and second migration profile;
   receive a selection of either the first migration profile or the second migration profile for the VMI while running on the first host server computer, so as to allow a user associated with the tenant to provide the selection to launch the VMI using the resource and state information associated with either the first migration profile or second migration profile on a second host server computer, wherein the receiving of the selection includes receiving an API request selecting the first migration profile of the second migration profile from a list of the generated first migration profile and second migration profile;

select the second host server computer from available host server computers by matching a resource of the second host server computer with the determined resource within the first migration profile or the second migration profile based on the user selection;

terminate, in response to receiving the selection, running of the VMI on the first host server computer; and launch the VMI on the second host server computer using the resource and state information of either the first migration profile or the second migration profile associated with the selection so as to move the VMI from the first host server computer to the second host server computer, wherein the user selection allows the user to launch the VMI using the determined resource and acquired state information associated with the first migration profile or the second migration profile.

2. The non-transitory computer-readable storage medium according to claim 1, further comprising instructions that, upon execution by one or more processors, further cause the computer system to: select the second host server computer from available host server computers within the multi-tenant network environment by matching a resource of the second host server computer with the determined resource within either the first migration profile or second migration profile associated with the selection.

3. The non-transitory computer-readable storage medium according to claim 1, wherein the determined resource comprises a hardware resource of the first host server computer or a software resource running on the first host server computer, and wherein the first migration profile or second migration profile provides for versioning the determined resource and state information.

4. The non-transitory computer-readable storage medium according to claim 3, wherein: the hardware resource comprises one or more of a CPU, memory, storage, and/or disk buffer; or the software resource comprises one or both of an operating system and/or at least one application running on the host server computer.

5. The non-transitory computer-readable storage medium according to claim 1, further comprising instructions that, upon execution by one or more processors, further cause the computer system to: assign an external IP address and a private IP address to the VMI running on the second host server computer that is the same as an external IP address and a private IP address for the VMI that was running on the first host server computer prior to the terminating.

6. A method of moving a virtual machine instance (VMI) within a compute service provider, the method comprising:
determining a resource of a first host server computer running the VMI;
acquiring at a first time point and at a second time point, according to a policy for automatically generating migration profiles associated with the VMI, state information for the resource used by the VMI while running on the first host server computer;
generating, based on the policy for automatically generating migration profiles associated with the VMI, a first migration profile for the first time point based on the determined resource and the state information acquired at the first time point;
generating, based on the policy for automatically generating migration profiles associated with the VMI, a second migration profile for the second time point based on the determined resource and the state information acquired at the second time point;
indexing the first migration profile and the second migration profile according to the first time point and the second time point and the state information acquired at the first time point and at the second time point;
storing the indexed first migration profile and second migration profile;
receiving a user selection of the first time point or the second time point, wherein the receiving of the user selection includes receiving an API request selecting the first time point or the second time point from a list of the generated first migration profile and second migration profile;
selecting the second host server computer from available host server computers within the compute service provider by matching a resource of the second host server computer with the determined resource within the first migration profile or the second migration profile based on the user selection; and
migrating the VMI from the first host server computer to a second host server computer based on the resource and the state information of the first migration profile or the second migration profile based on the user selection, wherein the user selection allows the user to launch the VMI using the determined resource and acquired state information associated with the first time point or the second time point.

7. The method according to claim 6, wherein the indexed first migration profile or second migration profile provides for versioning the determined resource and acquired state information.

8. The method according to claim 7, wherein the indexed first migration profile and second migration profile are stored in storage within the compute service provider.

9. The method according to claim 8, comprising: receiving an API request for available migration profiles; and in response to the API request, displaying a list including the indexed first migration profile and second migration profile.

10. The method according to claim 6, comprising:
terminating, in response to receiving the user selection, running of the VMI on the first host server computer.

11. The method according to claim 10, comprising: launching the VMI on the second host server computer using the state information within the first migration profile or the second migration profile based on the user selection so as to migrate the VMI from the first host server computer to the second host server computer.

12. The method according to claim 10, comprising: re-launching the VMI on the first host server computer using the state information within the first migration profile or the second migration profile based on the user selection.

13. The method according to claim 6, comprising: assigning, in a network address translation (NAT) table, an IP address for the VMI running on the second host server computer to be the same as an IP address for the VMI when running on the first host server computer prior to the migrating.

14. The method according to claim 6, wherein the determined resource comprises a hardware resource of the host server computer or a software resource running on the host server computer.

15. The method according to claim 14, wherein: the hardware resource comprises one or more of a CPU, memory, storage, and/or disk buffer; or the software resource comprises one or both of an operating system and/or at least one application running on the host server computer.

16. A system for moving a virtual machine instance (VMI) in a multi-tenant environment, the system comprising:

host server computers coupled together through a network to form the multi-tenant environment, at least a portion of the host server computers for executing virtual machines associated with a customer account;

a VMI migration service for generating, according to a policy associated with a tenant of the multi-tenant environment, a first migration profile at a first time point and a second migration profile at a second time point for one of the host server computers executing one of the virtual machines, each of the first migration profile and the second migration profile comprising state information of at least one hardware and/or software resource of the at least one host server computer at the corresponding first time point or the second time point, the VMI migration service for migrating the one of the virtual machines to a different host server computer within the multi-tenant environment using one of the first migration profile or second migration profile based on a user selection of one of the first time point or second time point, or a user selection of the first migration profile associated with the first time point or the second migration profile associated with the second time point; and a database coupled to the VMI migration service for storing the first migration profile and the second migration profile, wherein VMI migration service is configured to index the first migration profile and the second migration profile according to the first time point or the second time point for storage in the database, wherein the VMI migration service is operable to:

receive a first API request for available migration profiles for the virtual machines; and in response to the first API request, display a list of available migration profiles including the first migration profile and the second migration profile;

receive a second API request for the selection of the first time point or the second time point, or the first migration profile or the second migration profile, for re-launching the one of the virtual machines;

terminate, in response to receiving the second API request, the one of the virtual machines running on the one of the host server computers; and re-launch the one of the virtual machines on the one of the host server computers using state information of at least one hardware and/or software resource within the first migration profile or the second migration profile based on the second API request.

* * * * *